United States Patent
Featonby

(10) Patent No.: US 11,487,591 B1
(45) Date of Patent: Nov. 1, 2022

(54) AUTOMATICALLY CONFIGURING EXECUTION OF A CONTAINERIZED APPLICATION

(71) Applicant: Amazon Technologies, Inc., Seattle, WA (US)

(72) Inventor: Malcolm Featonby, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 64 days.

(21) Appl. No.: 16/915,712

(22) Filed: Jun. 29, 2020

(51) Int. Cl.
G06F 9/455 (2018.01)
G06F 9/50 (2006.01)
G06F 9/48 (2006.01)
G06F 9/445 (2018.01)

(52) U.S. Cl.
CPC ........ G06F 9/5077 (2013.01); G06F 9/44505 (2013.01); G06F 9/45558 (2013.01); G06F 9/4812 (2013.01); G06F 9/4881 (2013.01); G06F 2009/4557 (2013.01); G06F 2209/505 (2013.01)

(58) Field of Classification Search
CPC ............... G06F 9/5077; G06F 9/44505; G06F 9/45558; G06F 2009/4557; G06F 2209/505
See application file for complete search history.

(56) References Cited

U.S. PATENT DOCUMENTS

| | | | |
|---|---|---|---|
| 9,256,467 B1 * | 2/2016 | Singh | G06F 9/45558 |
| 9,549,038 B1 | 1/2017 | Anne | |
| 9,910,713 B2 | 3/2018 | Wisniewski et al. | |
| 9,928,108 B1 | 3/2018 | Wagner et al. | |
| 10,067,801 B1 | 9/2018 | Wagner | |
| 10,432,551 B1 | 10/2019 | Vosshall et al. | |
| 10,606,660 B1 | 3/2020 | Hartley et al. | |
| 10,771,337 B1 | 9/2020 | Das et al. | |
| 10,824,474 B1 | 11/2020 | Kamboj et al. | |
| 10,871,995 B2 | 12/2020 | Gerdesmeier et al. | |
| 2012/0210326 A1 | 8/2012 | Torr et al. | |

(Continued)

OTHER PUBLICATIONS

U.S. Appl. No. 16/217,454, filed Dec. 12, 2018, Aithal et al.

(Continued)

Primary Examiner — Dong U Kim
(74) Attorney, Agent, or Firm — Knobbe Martens Olson & Bear, LLP

(57) ABSTRACT

Provided is a system for automatically generating a set of parameters that can be used to execute a user application on a cluster of compute instances on behalf of a user, where the set of parameters specifies the one or more container images that need to be executed as part of executing the user application. For example, the user may specify a set of container images that are part of the user application, and the system may automatically determine the parameters that define the computing environment in which the user application is to be executed, such as the resource allocation and networking configuration parameters, without the user having to provide such parameters to the system. These parameters can be packaged into the set of parameters (also referred to herein as a task definition), which can be used in future executions of the user application.

20 Claims, 8 Drawing Sheets

(56) References Cited

U.S. PATENT DOCUMENTS

| | | | |
|---|---|---|---|
| 2012/0233668 A1* | 9/2012 | Leafe | G06F 9/00 |
| | | | 726/4 |
| 2013/0124807 A1 | 5/2013 | Nielsen et al. | |
| 2013/0160008 A1 | 6/2013 | Cawlfield et al. | |
| 2014/0358710 A1 | 12/2014 | Balestrieri et al. | |
| 2015/0106805 A1 | 4/2015 | Melander et al. | |
| 2015/0142878 A1 | 5/2015 | Hebert et al. | |
| 2016/0077846 A1 | 3/2016 | Phillips et al. | |
| 2016/0378559 A1 | 12/2016 | Bhandarkar et al. | |
| 2017/0078433 A1 | 3/2017 | Radhakrishnan et al. | |
| 2017/0090961 A1 | 3/2017 | Wagner et al. | |
| 2017/0177413 A1 | 6/2017 | Wisniewski et al. | |
| 2017/0177860 A1 | 6/2017 | Suarez et al. | |
| 2017/0180346 A1* | 6/2017 | Suarez | G06F 8/71 |
| 2017/0339158 A1 | 11/2017 | Lewis et al. | |
| 2017/0339196 A1 | 11/2017 | Lewis et al. | |
| 2018/0088993 A1 | 3/2018 | Gerdesmeier et al. | |
| 2018/0101403 A1 | 4/2018 | Baldini Soares et al. | |
| 2018/0129539 A1 | 5/2018 | Sadat | |
| 2018/0150325 A1 | 5/2018 | Kuo et al. | |
| 2018/0246745 A1 | 8/2018 | Aronovich et al. | |
| 2018/0331971 A1 | 11/2018 | Certain et al. | |
| 2019/0102231 A1 | 4/2019 | Wagner | |
| 2019/0108049 A1 | 4/2019 | Singh et al. | |
| 2019/0243681 A1* | 8/2019 | Chen | G06F 9/45545 |
| 2019/0294477 A1 | 9/2019 | Koppes et al. | |
| 2019/0324786 A1* | 10/2019 | Ranjan | G06F 9/5077 |
| 2019/0340033 A1 | 11/2019 | Ganteaume | |
| 2019/0347127 A1* | 11/2019 | Coady | G06F 11/3442 |
| 2020/0073649 A1 | 3/2020 | Viana et al. | |
| 2020/0142711 A1 | 5/2020 | Varda et al. | |
| 2020/0174842 A1 | 6/2020 | Wang et al. | |
| 2020/0213279 A1 | 7/2020 | Xiong et al. | |
| 2020/0241930 A1 | 7/2020 | Garg et al. | |
| 2020/0249977 A1 | 8/2020 | Mentz et al. | |
| 2020/0310845 A1 | 10/2020 | Liguori et al. | |
| 2020/0310850 A1 | 10/2020 | Liguori et al. | |
| 2020/0358719 A1 | 11/2020 | Mestery et al. | |
| 2020/0412596 A1 | 12/2020 | Cherunni | |
| 2021/0064442 A1 | 3/2021 | Alluboyina et al. | |
| 2021/0089361 A1 | 3/2021 | Rafey et al. | |
| 2021/0109775 A1 | 4/2021 | Shen et al. | |
| 2021/0117217 A1 | 4/2021 | Croteau et al. | |
| 2021/0141655 A1 | 5/2021 | Gamage et al. | |
| 2021/0158083 A1 | 5/2021 | Gan et al. | |
| 2021/0160162 A1 | 5/2021 | Abbas | |
| 2021/0184942 A1 | 6/2021 | Tootaghaj et al. | |

OTHER PUBLICATIONS

U.S. Appl. No. 16/367,801, filed Mar. 28, 2019, Featonby et al.
U.S. Appl. No. 16/699,309, filed Nov. 29, 2019, Goodman et al.
U.S. Appl. No. 16/909,756, filed Jun. 23, 2020, Featonby et al.
Dettori, "Blueprint for Business Middleware as a Managed Cloud Service", IEEE International Conference on Cloud Engineering, 2014, pp. 261-270.

* cited by examiner

```
1  {
2      "networkMode": "awsvpc",
3      "containerDefinitions": [
4          {
5              "essential": true,
6              "name": "webserverX",
7              "image": "webserverX:latest",
8              "memory": 2048,
9              "cpu": 1024,
10             "portMappings": [
11                 {
12                     "hostPort": 80,
13                     "containerPort": 8080,
14                     "protocol": "tcp"
15                 }
16             ],
17             "logConfiguration": {
18                 "logDriver": "awslogs",
19                 "options": {
20                     "awslogs-group": "/ecs/webserverX-container-logs",
21                     "awslogs-region": "us-east-1"
22                 }
23             }
24         },
25         {
26             "essential": true,
27             "name": "appY",
28             "image": "02358.dkr.ecr.us-west-2.amazonaws.com/appY:latest",
29             "memory": 200,
30             "cpu": 10,
31             "dependsOn": [
32                 {
33                     "containerName": "webserverX",
34                     "condition": "HEALTHY"
35                 }
36             ]
37             "portMappings": [
38                 {
39                     "containerPort": 5000,
40                     "protocol": "tcp"
41                 }
42             ]
43         }
44     ],
45     "family": "apps1"
46 }
```

*FIG. 4*

AUTOMATICALLY CONFIGURING EXECUTION OF A CONTAINERIZED APPLICATION

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

BRIEF DESCRIPTION OF THE DRAWINGS

FIG. 4 depicts a task definition generated based on the information provided in FIG. 2 in accordance with aspects of the present disclosure.

DETAILED DESCRIPTION

Introduction

Figure 1:
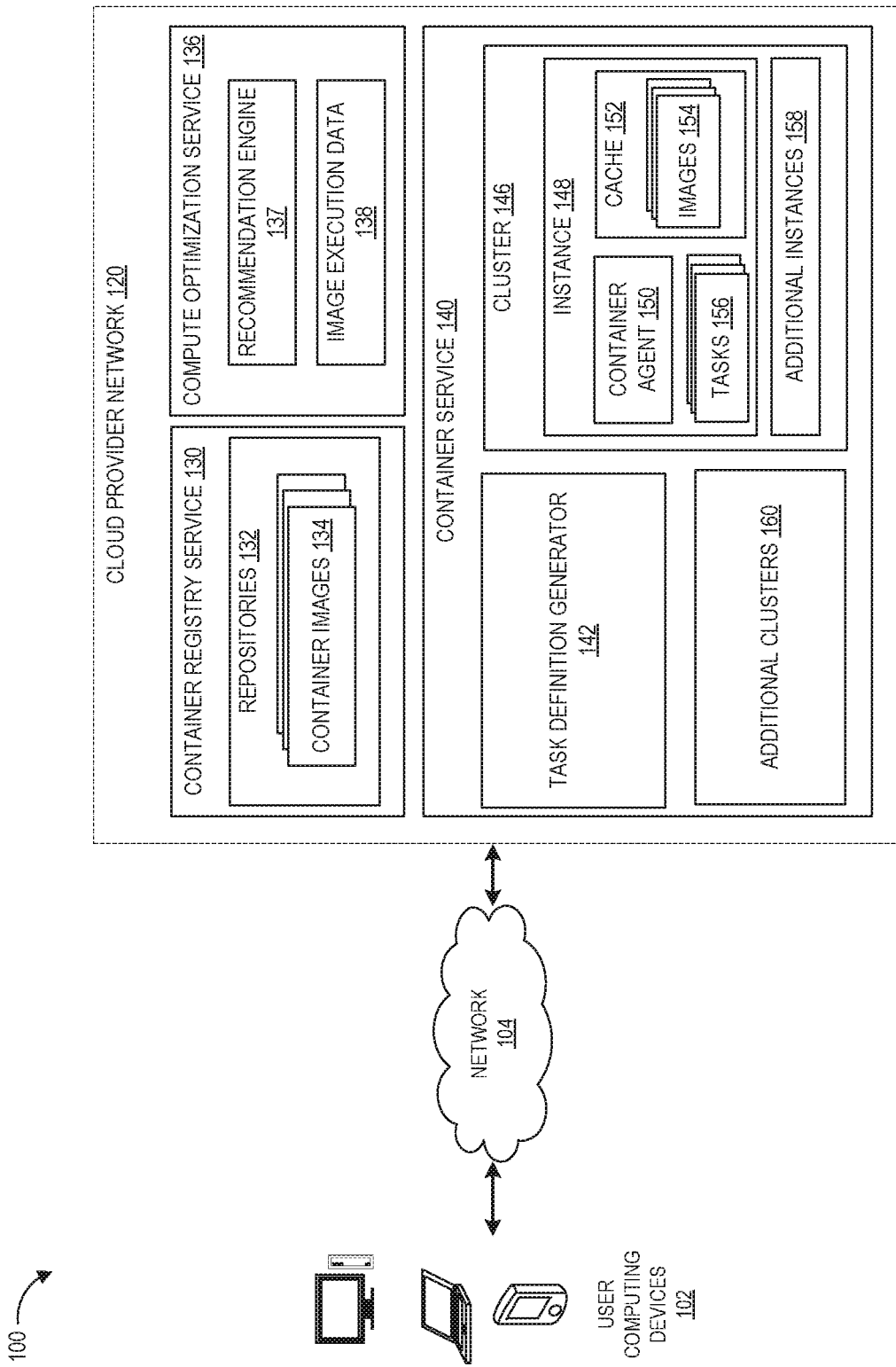
FIG. 1 depicts a schematic diagram of a network environment in which a cloud provider network is used to implement a container service and a task definition generator in accordance with aspects of the present disclosure.

Many software applications can run using one or more computing "clusters," which can include at least one cluster master (which runs control processes including scheduling, resource control, handling API requests, and deciding what runs on the cluster's nodes) and multiple nodes (which are the worker machines that run containerized applications and other workloads). These clusters can run across a number of physical machines in a distributed computing environment such as a cloud provider network.

A developer can package a software application and everything else needed to run the application in a container image (e.g., a standalone, executable package of software that includes everything needed to run an application process) and send a request to the cloud provider network to execute the application in a cluster. In the request, the developer may indicate where the container image can be found, typically in an image repository within the cloud provider network or in a public image repository outside the cloud provider network.

In addition to identifying the container images (also collectively referred to herein as a "task"), the developer may also specify certain configuration parameters that define the execution environment in which the container images are to be executed, for example, in a document known as an application definition or a task definition. Such a document may specify one or more container images to be executed, the order in which the container images are to be executed, the ports to which the container images are mapped, the disk mount points for the container images, the amounts of computing resources (e.g., memory, CPU, disk, networking resources, etc.) to be allocated to the container images, and the like.

Thus, even when a user knows exactly which container images he or she wishes to execute on the cloud provider network, the user may still need to spend the time and effort to figure out how the various aspects of the execution environment should be configured and specify those configurations in a formal document submitted to the cloud provider network. For example, the user may determine the execution requirements for each of the container images that the user wishes to execute and define a compute environment that can accommodate the entire application in the document. In some cases, such a process can be tedious, cumbersome, and time-consuming for the user.

The aforementioned challenge, among others, is addressed in some embodiments by the disclosed techniques for automatically generating a task definition defining the execution environment for executing container images. Accordingly, the burden of creating such a document placed on the user is reduced, and the user experience associated with launching the task on the cloud provider network is improved.

Generally described, one or more aspects of the present application relate to a system for automatically generating a definition that can be used to execute a user application on a cluster of compute instances on behalf of a user, where the definition specifies the one or more container images to be executed as part of executing the user application. For example, the user may specify a set of container images that are part of the user application, and the system may automatically determine the configurations for resource allocation and networking for executing the set of container images, without the user having to provide such configurations to the system. These configurations can be packaged into the definition, which can be used in future executions of the set of container images.

More specifically, the presently disclosed technology addresses the deficiencies described above by allowing the user to provide a minimal amount of information to the cloud provider network and automatically generating a task definition based on the information provided by the user. By doing so, the presently disclosed technology can significantly reduce the amount of time and effort expended by the user in preparation for launching a task on the cloud provider network, thereby improving the task launch experience and the efficiency of the cloud provider network.

As will be appreciated by one of skill in the art in light of the present disclosure, the embodiments disclosed herein improve the ability of computing systems, such as container systems and code execution systems, to provide mechanisms for simplifying the process of launching a containerized application on a cloud provider network. By automatically configuring the execution environment for the application and not placing the burden solely on the user, the cloud provider network of the present disclosure can address the deficiencies described above. Further, by utilizing historical data collected from prior executions of the same or similar container images on the cloud provider network, the cloud provider network can improve or optimize the configuration parameters to be used for future executions of container images on the cloud provider network.

Prior techniques generally relied on the user to specify the configuration parameters to be used for executing user applications. However, as described above, such approaches can be time-consuming and burdensome to the user. In contrast, embodiments of the present disclosure enable automatic configuration of execution of container images based on metadata associated with the container images as well as historical data relating to prior executions of container images that are identical or similar to the container images to be executed.

The presently disclosed embodiments therefore address technical problems inherent within computing systems, such as simplifying task launch, optimizing computing resource allocation, and reducing errors in execution environment configurations. These technical problems are addressed by the various technical solutions described herein, including automatically generating task definitions based on a set of container images specified by the user. Thus, the present disclosure represents an improvement on existing software execution systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Container Service and Prefetching Manager FIG. 1 depicts an example computing environment 100 including a cloud provider network 120 in which the disclosed container service and task definition generator can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for automatically configuring the execution of container images (e.g., by generating task definitions on behalf of the users of the cloud provider network 120) may be implemented in non-elastic computing environments as well.

The cloud provider network 120 can be accessed by user computing devices 102 over a network 104. The cloud provider network 120 may include a container registry service 130, a compute optimization service 136, and a container service 140 that are in networked communication with one another and with the network 104 to provide users with on-demand access to the services and resources provided by the cloud provider network 120.

The container registry service 130 provides repositories 132, which store container images 134 and image metadata (also referred to herein as an image manifest) about the container images 134. The image metadata associated with a container image may specify details about the container image and the runtime environment in which the container image is to be executed including, but not limited to, the image ID, tag, and/or digest that can be used to identify the container image, image path, image version, author, architecture, operating system, size, network host/domain/user names exposed network ports, expected resource allocations (CPU, memory, disk, network), and any other parameters specified by the user who uploaded the container image onto the container registry service 130 at the time of uploading the container image (or a public repository within or external to the cloud network provider 120).

The compute optimization service 136 provides recommendation engine 137 and image execution data 138. The recommendation engine 137 may provide recommendations regarding the various configurations that can be used for executing a given container image, such as a recommended instance type for executing the container image and a recommended amount of computing resources to be allocated for executing the container image. The image execution data 138 may indicate the performance metrics (e.g., configurations, peak resource usage, average resource usage, error rates, load spikes, etc.) associated with prior executions of a plurality of container images. Additional details relating to the compute optimization service 136 are provided, for example, in U.S. application Ser. No. 16/367,801, filed Mar. 28, 2019, titled "COMPUTE PLATFORM RECOMMENDATIONS FOR NEW WORKLOADS IN A DISTRIBUTED COMPUTING ENVIRONMENT," which is incorporated herein by reference in its entirety.

The container service 140 provides a task definition generator 142, a cluster 146, and additional clusters 160. The task definition generator 142 generates task definitions on behalf of the users of the cloud provider network 120. For example, the task definition generator 142 may receive a request to execute a set of container images and in response, automatically generate the configuration parameters that can be used for executing the set of container images by accessing the information stored by the container registry service 130 and/or the compute optimization service 136. The techniques for automatically configuring the execution of container images are described in greater detail below with reference to FIGS. 2-7. Although the additional clusters 160 are shown in FIG. 1, in other embodiments, the container service 140 may include only a single cluster.

The cluster 146 includes an instance 148 and additional instances 158. The instance 148 includes a container agent 150 configured to perform operations on behalf of the instance 148, cache 152 storing container images 154, and tasks 156 executing on the instance 148. Although the additional instances 158 are shown in FIG. 1, in other embodiments, the cluster 146 may include only a single instance. Although some embodiments of the present disclosure are described with reference to the instances 148 and the additional instances 158 that are part of the cloud provider network 120, in other embodiments, the techniques described herein are applied to one or more instances that are outside the cloud provider network 120 (e.g., implemented using the user computing devices 102 and/or other on-premises computing resources of the users of the cloud provider network 120).

The container service 140 may provide a set of application programming interfaces ("APIs") that can be used by the users of the user computing devices 102 to add, modify, or remove compute capacity to the clusters, generate and modify a task definition usable to execute a user application, and/or request execution of user applications (e.g., tasks) on the clusters. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network 120, enabling the development of applications that interact with resources and services hosted in the cloud provider network 120. APIs can also enable different services of the cloud provider network 120 to exchange data with one another.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of some software container services, a task refers to a container, or multiple containers working together, running to execute the functionality of a software application or a particular component of that application. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. For example, a task definition can specify one or more tasks to be launched, and each task may have a corresponding container image. The task definition may specify a set of container images (e.g., the set may include only a single container image or include multiple container images) that correspond to one or more tasks to be launched according to the task definition. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of the cloud provider network 120 can deploy containers by managing clusters of compute instances that run container agents. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Some implementations of the cloud provider network 120 can additionally include compute servers, object storage servers, block store servers, domain name services ("DNS") servers, relational database servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The container registry service 130, the compute optimization service 136, and/or the container service 140 may utilize the services provided by one or more of these servers to perform one or more of the techniques described herein. For example, the compute servers may be used to provide the instances 148 and 158). The compute servers may provide resizable computing capacity to users of the cloud provider network 120 for building and hosting their software systems. The compute servers and associated control plane functionality can provide an elastic compute cloud service of the cloud provider network 120. Compute resources can be provided from the compute servers to users of the cloud provider network 120 via an elastic compute cloud service (referred to in various implementations as an elastic compute service, a virtual machines service, a computing cloud service, a compute engine, or a cloud compute service). Users can use the compute servers to launch as many virtual or physical computing environments, referred to as "instances," as they need. The instances can have various configurations of processing power, memory, storage, and networking capacity depending upon user needs. The compute servers can also include computer storage for temporary data used while an instance is running; however, as soon as the instance is shut down this data is lost.

The cloud provider network 120 may provide the instances shown in FIG. 1 with varying computational and/or memory resources. In one embodiment, each of the instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. The instances 148 and 158 may include one or more of physical machines, virtual machines, containers, nodes, or other forms of virtual or physical compute units that are configured to execute one or more applications, or any combination thereof.

In some implementations, at least a subset of virtualization management tasks may be performed at one or more offloading cards so as to enable more of the processing capacity of the host to be dedicated to client-requested compute instances—e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning an instance generally includes reserving resources (e.g., computational and memory resources) of an underlying physical machine for the client (e.g., from a pool of available physical machines and other resources), installing or launching required software (e.g., an operating system), and making the instance available to the client for performing tasks specified by the client.

Additionally, the container registry service 130, the compute optimization service 136, and/or the container service 140 may utilize the services provided by object storage servers to perform one or more of the techniques described herein (e.g., to provide the repositories 132, to store the container images 134, and to store the image execution data 138). Such object storage servers provide another type of storage within the cloud provider network 120. The object storage servers and associated control plane functionality can provide an object-based storage service of the cloud provider network 120. Object-based storage services can be referred to as a blob storage service, cloud object storage service, or cloud storage service, in various implementations. The object storage servers include one or more servers on which data is stored as objects within resources referred to as buckets. Each object typically includes the data being stored, a variable amount of metadata that enables various capabilities for the object storage servers with respect to analyzing a stored object, and a globally unique identifier or key that can be used to retrieve the object. Objects stored on the object storage servers are associated with a unique identifier, such that authorized access to them can be obtained through requests from networked computing devices in any location.

Each bucket is associated with a given user account. Users can store as many objects as desired within their buckets, can write, read, and delete objects in their buckets, and can control access to their buckets and the objects contained therein. For example, the instances may access the buckets to write, read, or delete the objects contained therein. Further, in embodiments having a number of different object storage servers distributed across different ones of the regions described above, users can choose the region (or regions) where a bucket is stored, for example, to optimize for latency. Users can use object storage servers for purposes such as storing photos on social media websites, songs on music streaming websites, or files in online collaboration services, to name a few examples. Applications developed in the cloud often take advantage of the vast scalability and metadata characteristics of the object storage servers. The object storage servers can support highly parallel data accesses and transfers.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable physical and/or virtual computing devices via their use of the clusters 146 and 160 and/or the instances 148 and 158 illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for automatically configuring execution of container images and/or generating task definitions usable to execute such container images can be implemented as part of a virtual compute service, container service, or Kubernetes-based container service in some embodiments.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

Although some embodiments of the present disclosure describe an instance as being a virtual machine, an instance, as used herein, may refer to any one of a virtual machine instance, a bare-metal instance, a microVM, a physical machine, a container, a node, an offload card, or another unit of compute capacity configurable to execute user code. Such an instance may reside within the cloud provider network 120 or within an on-premises environment outside the cloud provider network 120.

Example User Interface for Generating Task Definition

Figure 2:
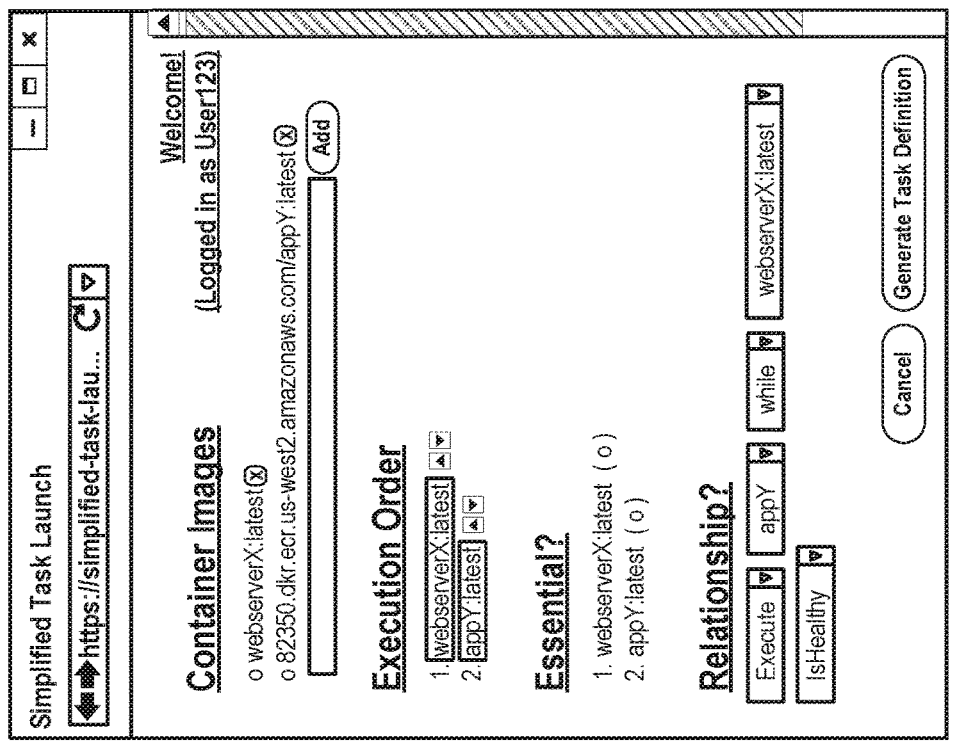
FIG. 2 depicts a user interface for generating a task definition in accordance with aspects of the present disclosure.

FIG. 2 depicts a user interface 200 for generating a task definition. As shown in FIG. 2, the user interface 200 includes a user interface element for adding and removing container images, a user interface element for specifying the execution order of the specified container images, a user interface element for indicating whether each of the specified container images is essential (e.g., whether the task should terminate if the container image terminates or fails), and a user interface element for specifying relationships among the specified container images and/or conditions for taking one or more actions (e.g., execute, terminate, pause, etc.) with respect to the specified container images. As shown in FIG. 2, the user interface 200 also includes a user interface element for initiating generation of a task definition based on the information provided in the user interface 200. Alternatively, or additionally, the user interface 200 may include a "launch task" button for initiating execution of the container images specified in the user interface 200 according to the task definition automatically generated based on the information provided in the user interface 200. The user interface elements of FIG. 2 are shown as illustrative examples, and in other embodiments, one or more of the user interface elements may be omitted or modified and/or one or more user interface elements may be added, in accordance with the aspects of the present disclosure. In some embodiments, instead of the user interface 200, the information that would be provided via the user interface 200 is provided to the container service 140 via a command line interface (CLI). In some embodiments, the user interface 200 may include a user interface element for uploading a file specifying some or all of the information specified in the user interface 200. For example, the user interface 200 may allow a user to upload a JavaScript Object Notation (JSON) file specifying one or more of (i) the list of container images, (ii) the execution order, (iii) whether the container images are essential, and (iv) the relationships between the container images.

Figure 3:
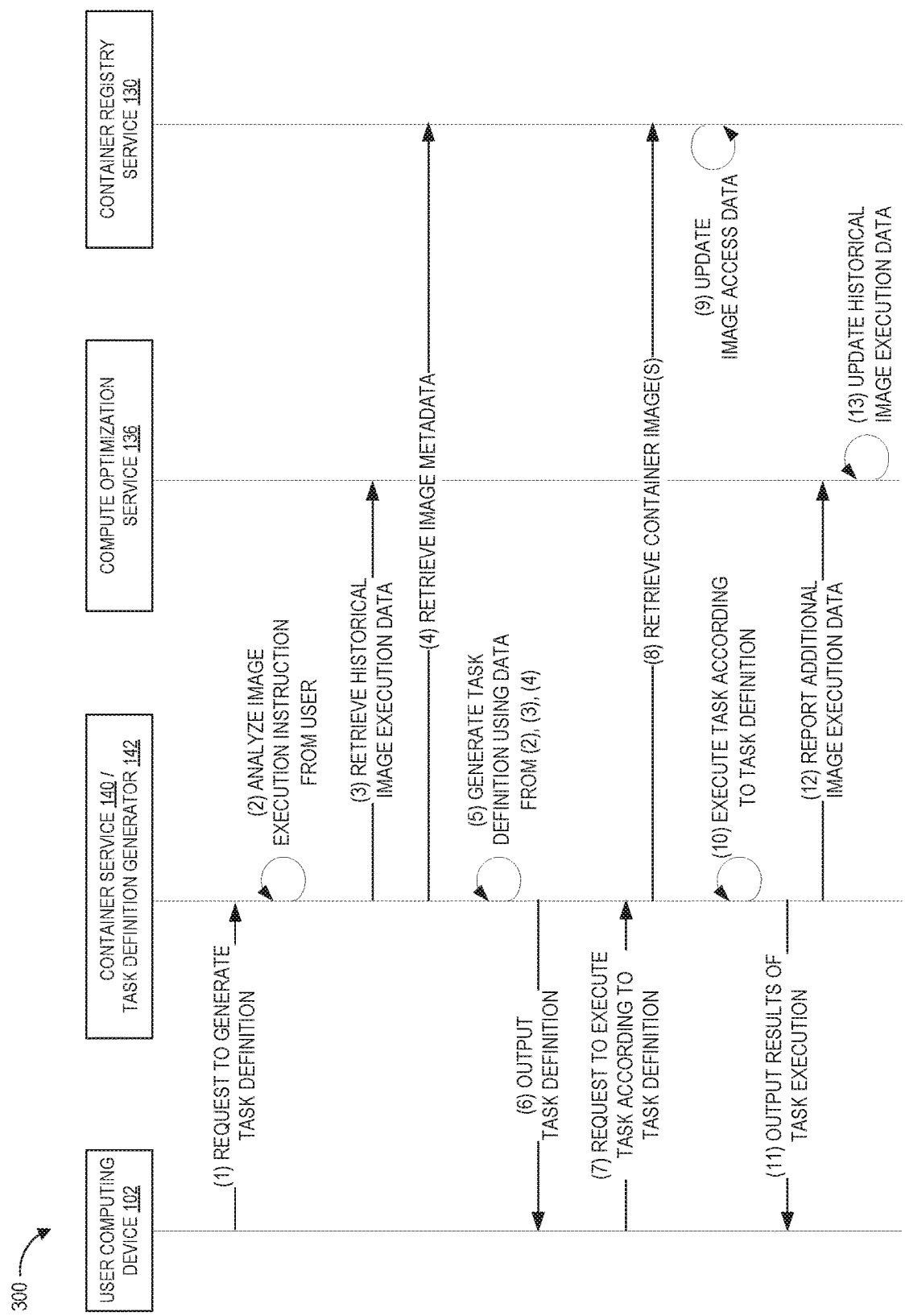
FIG. 3 depicts a workflow diagram illustrating the interactions between the various components of FIG. 1 in accordance with aspects of the present disclosure.

Example Workflow for Configuring and Performing Execution of Container Images FIG. 3 depicts a workflow diagram 300 illustrating the interactions between the various components of FIG. 1 in automatically configuring and performing execution of container images in accordance with aspects of the present disclosure. As shown in FIG. 3, at (1), the user computing device 102 submits a request to generate a task definition that can be used to execute one or more container images to the container service 140, for example, via a console user interface or a command line interface provided by the container service 140. The request may indicate (i) an identifier associated with each of the plurality of container images that the user wishes to execute on the container service 140 and (ii) an image execution instruction indicative of how the plurality of container images are to be executed. For example, the request may include the information shown in FIG. 2. At (2), the task definition generator 142 (and/or the container service 140) analyzes the image execution instruction (and/or any other information provided in the request).

At (3), the task definition generator 142 retrieves historical image execution data from the compute optimization service 136. For example, the historical image execution data may include historical resource utilization data indicating a history of resource usage by prior and/or current executions of one or more container images. At (4), the task definition generator 142 retrieves image metadata from the container registry service 130.

At (5), the task definition generator 142 generates a task definition using data retrieved or determined at (2), (3), and (4). For example, using these data, the task definition generator 142 may determine resource allocations, port mappings, disk mount points, network configurations, and/or the order in which the container images should be executed, and include the determined information in the task definition (e.g., as shown in FIG. 4). Although not illustrated in FIG. 3, the task definition generator 142 may store one or more default configuration parameters of a user that may be used to generate a task definition on behalf of the user. Such default parameters may be determined by the task definition generator 142 or provided by the user at the user computing device 102 prior to (1) (or in response to (1)), and such default parameters may be used, along with the data retrieved or determined at (2), (3), and (4), to generate the task definition at (5). The default parameters may include one or more of the configuration parameters described herein as being potentially specified in a task definition. At (6), the task definition generator 142 outputs the task definition to the user computing device 102.

At (7), the user computing device 102 submits a request to execute the task according to the task definition. In response, at (8), the container service 140 retrieves the container image(s) specified in the task definition from the container registry service 130. For example, the container image(s) may be downloaded onto the cache of an instance identified by the container service 140 to execute the container image(s) thereon. In response, at (9), the container registry service 130 updates the image access data associated with the container image(s) (e.g., to reflect the retrieval of the container image(s) in the image access data). Such image access data may indicate the frequency at which a container image has been accessed and/or the recency of such access.

At (10), the container service 140 executes the task according to the task definition using the compute resources (e.g., a specific instance in a cluster assigned to the user at the user computing device 102 or to the cloud network provider 120) that the container service 140 has acquired for executing the task. For example, executing the task may involve executing each of the container images specified in the task definition in the manner specified in the task definition. At (11), the container service 140 outputs the results of the task execution to the user computing device 102.

At (12), the container service 140 reports additional image execution data, which may include details of the task execution, to the compute optimization service 136. In response, at (13), the compute optimization service 136 updates the historical image execution data corresponding to the one or more container images executed according to the task definition at (10).

As illustrated, by automatically configuring the execution of container images, the container service 140 reduces the burden placed on the user of the user computing device 102 and improves the task launch experience.

In other embodiments, one or more steps shown in FIG. 3 may be modified or omitted and/or the order in which the steps are performed may be changed. For example, (6) and (7) may be omitted, and the workflow may proceed directly to (8) from (5). Also, (11) may be omitted, as the task execution at (10) continues indefinitely.

Example Task Definition

FIG. 4 depicts a task definition 400 automatically generated based on the information provided in FIG. 2 in accordance with aspects of the present disclosure. As shown in FIG. 4, the task definition 400 specifies the network mode of the task, names of the container images ("webserverX" and "appY"), whether the container images are essential, the memory and CPU resources to be allocated to the container images, port mappings for the container images, log configurations for the container images, conditions associated with the container images (container image "appY" "dependsOn" the container image "webserverX" being "HEALTHY"), and the family name associated with the task. Additional details relating to task definitions and container images are provided, for example, in U.S. application Ser. No. 14/538,663 (U.S. Pat. No. 9,256,467; issued Feb. 9, 2016), titled "SYSTEM FOR MANAGING AND SCHEDULING CONTAINERS," which is incorporated herein by reference in its entirety.

Example Routine for Automatically Configuring Execution of Container Images

Figure 5:
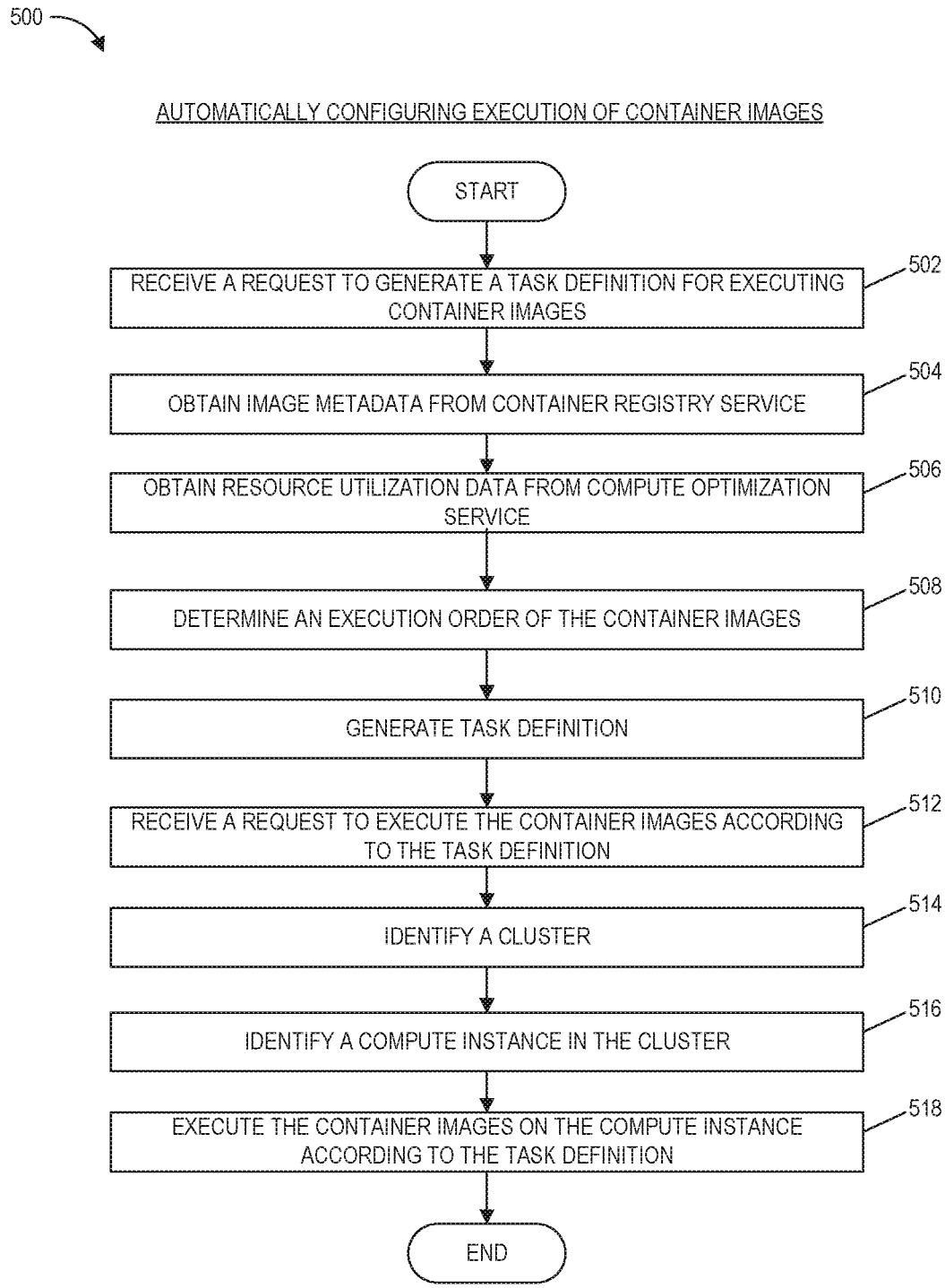
FIG. 5 is a flowchart of an example process for automatically configuring execution of container images in accordance with aspects of the present disclosure.

FIG. 5 depicts an illustrative routine 500 for automatically configuring execution of container images in accordance with aspects of the present disclosure. The routine 500 may be carried out, for example, by the container service 140 (or a component thereof such as the task definition generator 142) or one or more other components of the cloud provider network 120 described herein. For convenience, some or all of the steps of the routine 500 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 500.

The routine 500 begins at 502, where the container service 140 receives, from the user computing device 102, a request to generate a task definition for executing container images. For example, the request may indicate (i) an identifier associated with each of the plurality of container images that the user wishes to execute and (ii) an image execution instruction indicative of how the plurality of container images are to be executed.

At block 504, the container service 140 obtains image metadata from the container registry service 130. For example, the container service 140 may obtain, using the identifiers associated with the container images, the image metadata associated with the respective container images from the container registry service 130.

At block 506, the container service 140 obtains resource utilization data from the compute optimization service 136. For example, the container service 140 may obtain, using the identifiers associated with the container images, the historical resource utilization data associated with the respective container images from the compute optimization service 136. In some embodiments, the obtained resource utilization data is for prior executions of the same container image. In other embodiments, the obtained resource utilization data is for prior executions of one or more container images that are similar to the container image whose execution is requested at block 502. A container image may be similar to another container image if the container images contain one or more identical container image layers (e.g., readable/writable or read-only layers that are used as building blocks for the container image). For example, a layer may be identified and compared with other layers using its name and/or its hash value.

In some embodiments, the container service 140 takes the combination of container images into account when obtaining data from the compute optimization service 136. For example, the container service 140 may request utilization data corresponding to executing container image "imageA" for implementing a web server together with container image "imageB" for implementing a caching system. In response, the compute optimization service 136 may indicate which set of configurations (e.g., computing resource allocations) worked best in the past (e.g., judging based on performance metrics such as % resource utilization, error rates, etc.) for executing the specific combination of "imageA" and "imageB" together.

At block 508, the container service 140 determines an execution order of the container images. For example, the container service 140 may determine the execution order based on the information included in the request received at block 502, where the image execution instruction specifies the order in which the plurality of container images should be executed.

At block 510, the container service 140 generates a task definition based on one or more of the execution order, image metadata, resource utilization data, or other default configuration parameters described herein, where the task definition generated by the container service 140 specifies a set of configuration parameters according to which the plurality of container images are to be executed. For example, based on the average consumption and/or peak consumption of computing resources (e.g., CPU, memory, disk, network, etc.) indicated by the historical utilization data, the container service 140 may determine the amount of computing resources to be allocated to executing the combination of container images that make up the user application. In some cases, the amount of computing resources is less than the maximum amount of computing resources available on the virtual machine on which the container images are to be executed. In some cases, the amount of computing resources is different from a default amount of computing resources specified or indicated by the image metadata of the container images. Alternatively, the data received from the compute optimization service 136 may already specify the amount of computing resources to be allocated to executing the container images, and the container service 140 may include the specified amount in the task definition. An example of the task definition is shown in FIG. 4.

At block 512, the container service 140 receives a request to execute the container images according to the task definition. In other embodiments, the container service 140 may proceed with executing the plurality of container images according to the generated task definition without specific instructions from the user computing device 102.

At block 514, the container service 140 identifies a cluster in which the container images can be executed. In some embodiments, the container service 140 identifies the cluster based on the task definition. In other embodiments, the container service 140 identifies the cluster based on default settings associated with the user or user-specified settings associated with the user without reference to the task definition.

At block 516, the container service 140 identifies a compute instance in the cluster on which the container images can be executed. In some embodiments, the container service 140 identifies the compute instance based on the task definition. For example, the container service 140 may identify a compute instance that satisfies the instance type and the resource allocation requirements specified in the task definition. In other embodiments, the container service 140 identifies the compute instance based on default settings associated with the user without reference to the task definition.

At block 518, the container service 140 executes the container images on the compute instance according to the task definition. Although not illustrated in FIG. 5, the results of the execution of the container images may be reported to the user computing device 102 and/or logged according to the logging method specified in the task definition. The routine 500 may then end.

The routine 500 can include fewer, more, or different blocks than those illustrated in FIG. 5 and/or one or more blocks illustrated in FIG. 5 may be modified, omitted, or switched without departing from the spirit and scope of the description. For example, in some embodiments, block 508 is not performed, and the container images are executed as they become available for execution. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Executing Container Images Using Modified Task Definition

Figure 6:
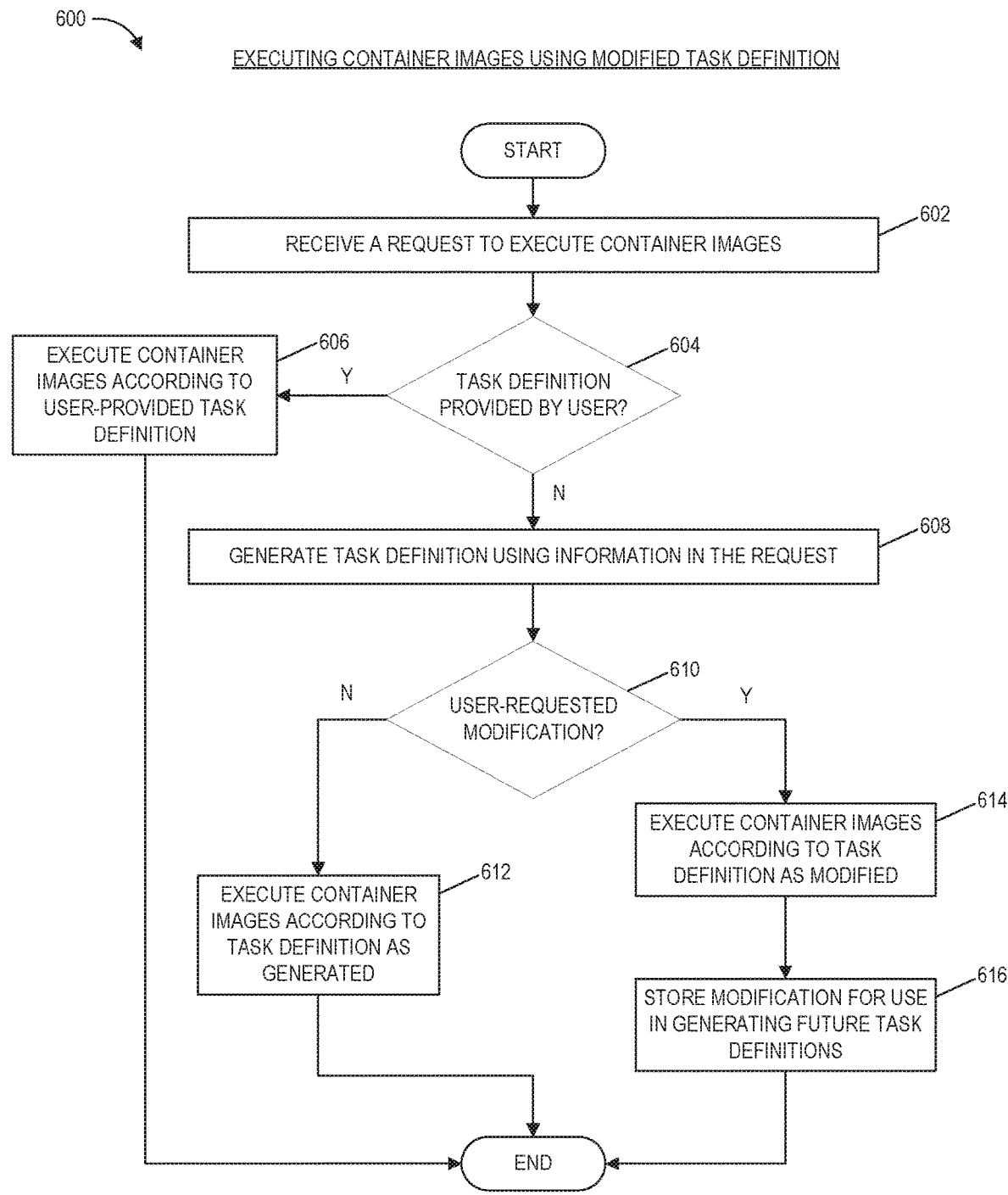
FIG. 6 is a flowchart of an example process for executing container images using a modified task definition in accordance with aspects of the present disclosure.

FIG. 6 depicts an illustrative routine 600 for executing container images using a modified task definition in accordance with aspects of the present disclosure. The routine 600 may be carried out, for example, by the container service 140 (or a component thereof such as the task definition generator 142) or one or more other components of the cloud provider network 120 described herein. For convenience, some or all of the steps of the routine 600 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 600.

The routine 600 begins at 602, where the container service 140 receives a request to execute one or more container images.

At block 604, the container service 140 determines whether a task definition is provided by the user submitting the request. If the container service 140 determines that a task definition is provided by the user, the routine 600 proceeds to block 606, where the container service 140 executes the container images according to the user-provided task definition. If the container service 140 determines that a task definition is not provided by the user, the routine 600 proceeds to block 608.

At block 608, the container service 140 generates a task definition using information provided in the request received at block 602.

At block 610, the container service 140 determines whether the user has requested a modification to the task definition generated by the container service 140 at block 608. For example, after the task definition has been outputted to the user, the user may have made one or more changes to the configurations specified in the task definition, for example, to increase or decrease the resource allocations, to change the port mappings, to change the instance type, and the like. In other cases, the user may have provided one or more override parameters (e.g., prior to the generation of the task definition or in response to the generation of the task definition) that conflict with the parameters included in the task definition generated by the container service 140 at block 608.

If the container service 140 determines that the user has not requested a modification to the task definition, the routine 600 proceeds to block 612, where the container service 140 executes the container images according to the task definition as generated at block 608. If the container service 140 determines that the user has requested a modification to the task definition, the routine 600 proceeds to block 614.

At block 614, the container service 140 executes the container images according to the task definition as modified.

At block 616, the container service 140 stores the user-requested modification for use in generating future task definitions. For example, if the task definition generated at block 608 allocated 1 GB of memory for executing container image "imageX" but the user has modified (or requested to modify) the memory allocation to 2 GB, the container service 140 may store this information so that the container service 140, when generating another set of configurations for executing container image "imageX," can use the information (e.g., to increase the memory allocation or to specify 2 GB instead of 1 GB). Although memory allocation is used as an example, other configuration parameters included in the task definition can be modified at the request of the user. The routine 600 may then end.

The routine 600 can include fewer, more, or different blocks than those illustrated in FIG. 6 and/or one or more blocks illustrated in FIG. 6 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Updating User-Provided Task Definition

Figure 7:
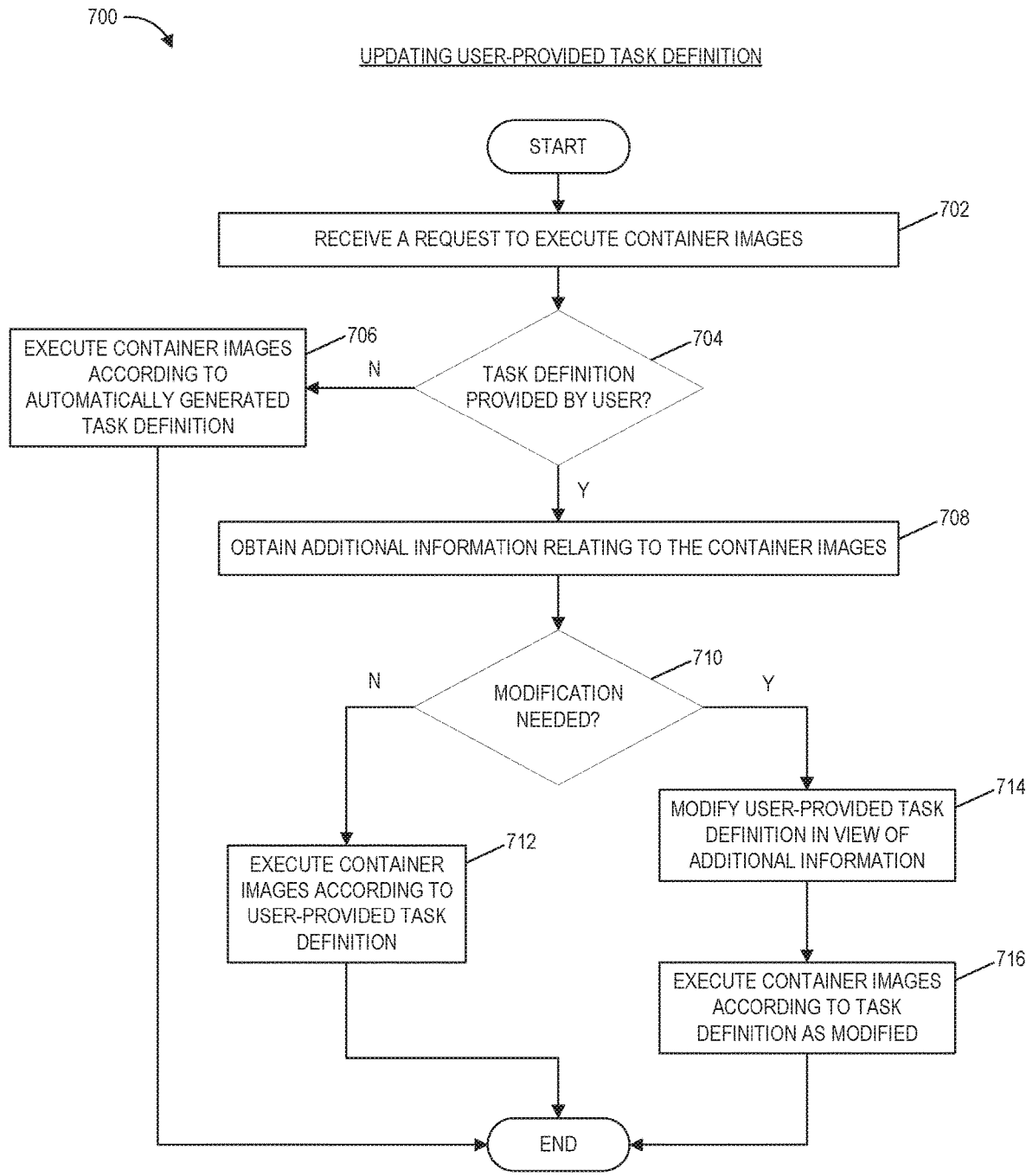
FIG. 7 is a flowchart of an example process for updating a user-provided task definition in accordance with aspects of the present disclosure.

FIG. 7 depicts an illustrative routine 700 for updating a user-provided task definition in accordance with aspects of the present disclosure. The routine 700 may be carried out, for example, by the container service 140 (or a component thereof such as the task definition generator 142) or one or more other components of the cloud provider network 120 described herein. For convenience, some or all of the steps of the routine 700 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 700.

The routine 700 begins at 702, where the container service 140 receives a request to execute one or more container images.

At block 704, the container service 140 determines whether a task definition is provided by the user submitting the request. If the container service 140 determines that a task definition is not provided by the user, the routine 700 proceeds to block 706, where the container service 140 automatically generates a task definition and executes the container images according to the automatically generated task definition. If the container service 140 determines that a task definition is provided by the user, the routine 700 proceeds to block 708.

At block 708, the container service 140 obtains additional information relating to the container images. For example, the container service 140 may obtain, using the identifiers of the container images provided in the request received at block 702, image metadata associated with the container images from the container registry service 130 and/or historical resource utilization data associated with the container images from the compute optimization service 136.

At block 710, the container service 140 determines whether a modification can be or needs to be made to the task definition provided by the user, based on the additional information obtained by the container service 140 at block 708. For example, the historical resource utilization data may indicate that container image "imageY" included in the user-provided task definition has used 1 GB of memory on average, but the user-provided task definition may specify that 8 GB of memory should be allocated to "imageY." In such an example, the container service 140 may determine that the amount of memory to be allocated to "imageX" should be reduced. As another example, the container service 140 may identify a port mapping conflict or a mount point conflict that should be resolved.

If the container service 140 determines that there is no modification to be made to the task definition provided by the user, the routine 700 proceeds to block 712, where the container service 140 executes the container images according to the user-provided task definition. If the container service 140 determines that there is a modification to be made to the task definition provided by the user, the routine 700 proceeds to block 714.

At block 714, the container service 140 modifies the user-provided task definition in view of the additional information obtained at block 708. In the memory allocation example above, the container service 140 may modify the memory allocation specified in the user-provided task definition for "imageY" to 2 GB or 4 GB. In the port mapping and mount point conflict example above, the container service 140 may modify the port mappings and/or the mount points specified in the user-provided task definition to resolve the conflict. Such modifications may be made automatically on behalf of the user or after requesting and obtaining the user's approval.

At block 716, the container service 140 executes the container images according to the task definition as modified, where the modified task definition is different from the task definition originally provided by the user (e.g., at block 702 along with the request). The routine 700 may then end.

The routine 700 can include fewer, more, or different blocks than those illustrated in FIG. 7 and/or one or more blocks illustrated in FIG. 7 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Container Service

Figure 8:
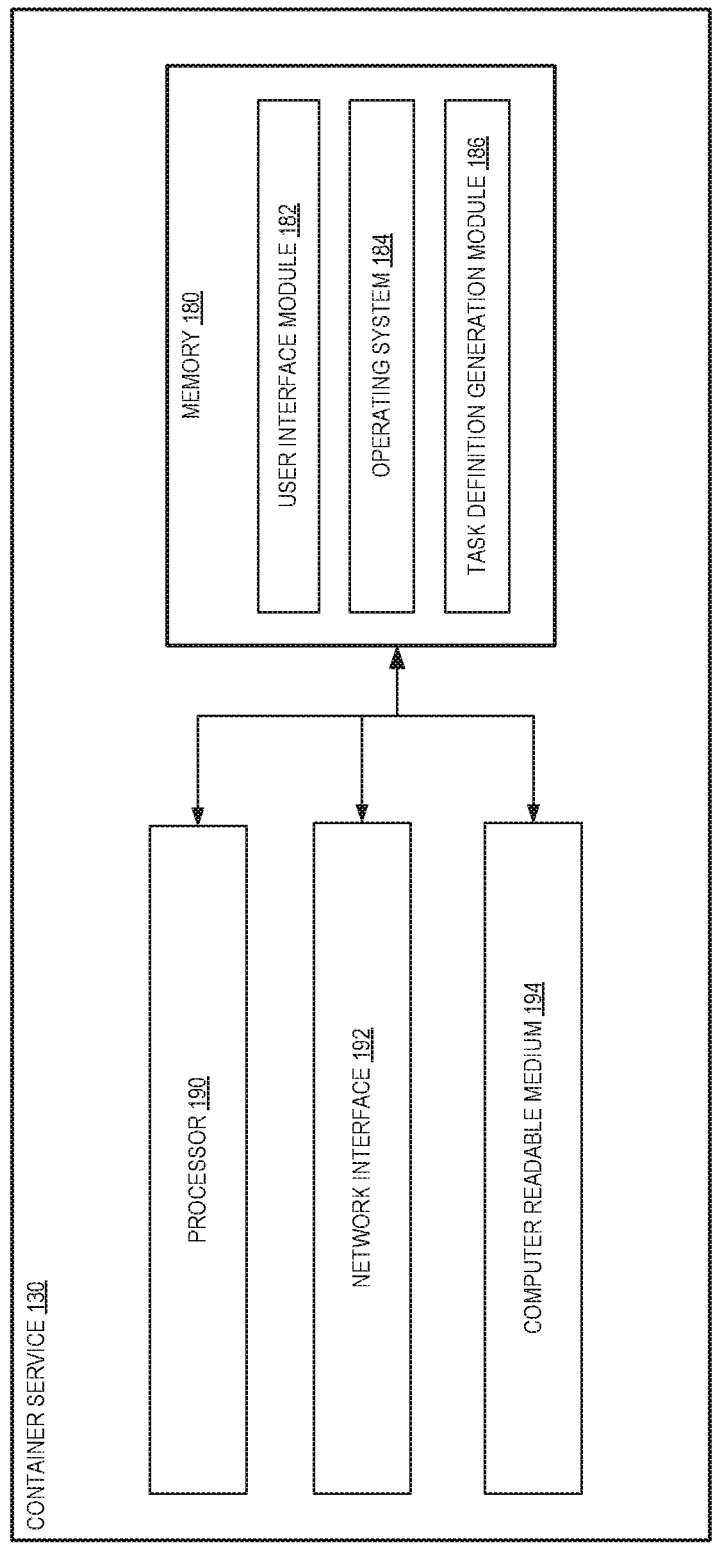
FIG. 8 depicts a general architecture of a computing device or system providing a container service in accordance with aspects of the present disclosure.

FIG. 8 depicts an example architecture of a computing system (referred to as the container service 140) that can be used to perform one or more of the techniques described herein or illustrated in FIGS. 1-8. The general architecture of the container service 140 depicted in FIG. 8 includes an arrangement of computer hardware and software modules that may be used to implement one or more aspects of the present disclosure. The container service 140 may include many more (or fewer) elements than those shown in FIG. 8. It is not necessary, however, that all of these elements be shown in order to provide an enabling disclosure. As illustrated, the container service 140 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the container service 140. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 182, the memory 180 may include a task definition generation module 186 that may be executed by the processor 190. In one embodiment, the task definition generation module 186 implements various aspects of the present disclosure, e.g., those illustrated in FIGS. 1-7 or described with reference to FIGS. 1-7.

While the task definition generation module 186 is shown in FIG. 8 as part of the container service 140, in other embodiments, all or a portion of the task definition generation module 186 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the container service 140. It will also be appreciated that, in some embodiments, a user computing device (e.g., the user computing device 102 of FIG. 1) may implement functionality that is otherwise described herein as being implemented by the elements and/or modules of the container service 140. For example, the user computing device 102 may receive code modules or other instructions from the container service 140 and/or other components of the cloud provider network 120 via the network 104 that are executed by the user computing device 102 to implement various aspects of the present disclosure.

Although a single processor, a single network interface, a single computer-readable medium, and a single memory are illustrated in the example of FIG. 8, in other implementations, the container service 140 can have a multiple of one or more of these components (e.g., two or more processors and/or two or more memories).

Example Implementations (EIs)

Some enumerated example implementations (EIs) are provided in this section, without limitation.

EI 1: A cloud provider system comprising: a set of clusters hosted on a plurality of physical machines, wherein each cluster in the set of clusters includes a virtual machine configured to execute container images; a container registry service providing a plurality of image repositories, wherein each image repository of the plurality of image repositories is configured to at least store (i) the container images, and (ii) image metadata corresponding to individual ones of the container images; a compute optimization service configured to store historical resource utilization data associated with executions of the individual ones of the container images; and a container service comprising computer hardware, wherein the container service is configured to at least: receive, from a user computing device, a request to generate a task definition usable to execute a subset of the container images, wherein the request at least indicates an identifier associated with each container image of the subset of the container images; for each container image in the subset of the container images, obtain, using the identifier associated with the container image, the image metadata associated with the container image from the container registry service; and obtain, using the identifier associated with the container image, the historical resource utilization data associated with the container image from the compute optimization service; determine an execution order in which the subset of the container images is to be executed; based at least in part on the image metadata and the historical resource utilization data, generate a first task definition usable to execute the subset of the container images, wherein the first task definition specifies a set of parameters according to which the subset of the container images is to be executed; identify a first cluster of the set of clusters that is usable to execute the subset of the container images; identify, based at least in part on the set of parameters specified by the first task definition, a first virtual machine in the first cluster; and cause the subset of the container images to be executed in the execution order on the first virtual machine according to the set of parameters specified by the first task definition.

EI 2: The cloud provider system of any preceding EI or any combination of the preceding EIs, wherein the set of parameters includes a resource allocation amount, and wherein the container service is further configured to determine the resource allocation amount based at least in part on the historical resource utilization data associated with the subset of the container images.

EI 3: The cloud provider system of any preceding EI or any combination of the preceding EIs, wherein the subset of the container images comprises a first container image and a second container image, and wherein the execution order specifies that the second container image is to be executed while, but not before, the first container image is executing.

EI 4: The cloud provider system of any preceding EI or any combination of the preceding EIs, wherein the container service is further configured to at least: receive, from the user computing device, an override parameter to be used to modify the first task definition; and modify the first task definition based at least in part on the override parameter prior to causing the subset of the container images to be executed.

EI 5: A computer-implemented method comprising: receiving a request to execute an application comprised of a set of container images, wherein the request at least indicates a plurality of identifiers, and wherein each identifier of the plurality of identifiers is associated with a container image of the set of container images; determining, based at least in part on the plurality of identifiers, image metadata associated with the set of container images; determining, based at least in part on the plurality of identifiers, historical resource utilization data associated with the set of container images; generating, based at least in part on the image metadata and the resource utilization data, a first set of parameters usable to define an execution environment in which the set of container images is to be executed as part of executing the application, wherein the first set of parameters at least indicates an amount of compute capacity to be allocated to executing the set of container images and includes at least one configuration parameter not specified in the request to execute the application; acquiring, based at least in part on the first set of parameters, a compute instance on which the set of container images are to be executed, wherein the compute instance includes at least the amount of compute capacity indicated by the first set of parameters and is configured according to the at least configuration parameter included in the first set of parameters; and executing the set of container images on the compute instance according to the first set of parameters.

EI 6: The computer-implemented method of any preceding EI or any combination of the preceding EIs, wherein the at least configuration parameter included in the first set of parameters comprises a networking configuration parameter usable to define one or more networking parameters of the compute instance.

EI 7: The computer-implemented method of any preceding EI or any combination of the preceding EIs, wherein the at least configuration parameter included in the first set of parameters comprises a disk mount point usable to attach a disk to the compute instance.

EI 8: The computer-implemented method of any preceding EI or any combination of the preceding EIs, further comprising determining, based at least in part on the plurality of identifiers indicated by the request, an order in which the set of container images is to be executed, wherein the order is specified in the first set of parameters.

EI 9: The computer-implemented method of any preceding EI or any combination of the preceding EIs, further comprising determining, based at least in part on the plurality of identifiers indicated by the request, a condition for terminating the execution of a container image in the set of container images, wherein the condition is specified in the first set of parameters.

EI 10: The computer-implemented method of any preceding EI or any combination of the preceding EIs, further comprising: subsequent to the generation of the first set of parameters, receiving a request to modify the first set of parameters to replace an original parameter in the first set of parameters with an override parameter; replacing the original parameter in the first set of parameters with the override parameter; and executing the application according to the first set of parameters in which the original parameter has been replaced with the override parameter.

EI 11: The computer-implemented method of any preceding EI or any combination of the preceding EIs, further comprising: storing an indication of replacing the original parameter with the override parameter; receiving another request to execute the application; based at least in part on the stored indication of replacing the original parameter with the override parameter, generating a second set of parameters that includes the override parameter; and executing the set of container images according to the second set of parameters including the override parameter.

EI 12: The computer-implemented method of any preceding EI or any combination of the preceding EIs, wherein the compute instance is one of a virtual machine instance, a bare-metal instance, a physical machine, a container, a microVM, a node, or an offload card.

EI 13: A non-transitory computer-readable medium storing instructions that, when executed by a computing system, cause the computing system to at least: receive a request to execute an application comprised of a set of container images, wherein the request at least indicates a plurality of identifiers, and wherein each identifier of the plurality of identifiers is associated with a container image of the set of container images; determine, based at least in part on the plurality of identifiers, image metadata associated with the set of container images; determine, based at least in part on the plurality of identifiers, historical resource utilization data associated with the set of container images; generate, based at least in part on the image metadata and the resource utilization data, a first set of parameters usable to define an execution environment in which the set of container images is to be executed as part of executing the application, wherein the first set of parameters at least indicates an amount of compute capacity to be allocated to executing the set of container images and includes at least one configuration parameter not specified in the request to execute the application; acquire, based at least in part on the first set of parameters, a compute instance on which the set of container images are to be executed, wherein the compute instance includes at least the amount of compute capacity indicated by the first set of parameters and is configured according to the at least configuration parameter included in the first set of parameters; and cause the set of container images to be executed on the compute instance according to the first set of parameters.

EI 14: The non-transitory computer-readable medium of any preceding EI or any combination of the preceding EIs, wherein the at least configuration parameter included in the first set of parameters comprises a networking configuration parameter usable to define one or more networking parameters of the compute instance.

EI 15: The non-transitory computer-readable medium of any preceding EI or any combination of the preceding EIs, wherein the at least configuration parameter included in the first set of parameters comprises a disk mount point usable to attach a disk to the compute instance.

EI 16: The non-transitory computer-readable medium of any preceding EI or any combination of the preceding EIs, storing further instructions that, when executed by the computing system, cause the computing system to at least determine, based at least in part on the plurality of identifiers indicated by the request, an order in which the set of container images is to be executed, wherein the order is specified in the first set of parameters.

EI 17: The non-transitory computer-readable medium of any preceding EI or any combination of the preceding EIs, storing further instructions that, when executed by the computing system, cause the computing system to at least determine, based at least in part on the plurality of identifiers indicated by the request, a condition for terminating the execution of a container image in the set of container images, wherein the condition is specified in the first set of parameters.

EI 18: The non-transitory computer-readable medium of any preceding EI or any combination of the preceding EIs, storing further instructions that, when executed by the computing system, cause the computing system to at least: receive, subsequent to the generation of the first set of parameters, a request to modify the first set of parameters to replace an original parameter in the first task definition with an override parameter; cause the original parameter in the first set of parameters to be replaced with the override parameter; and cause the application to be executed according to the first set of parameters in which the original parameter has been replaced with the override parameter.

EI 19: The non-transitory computer-readable medium of any preceding EI or any combination of the preceding EIs, storing further instructions that, when executed by the computing system, cause the computing system to at least: cause an indication of replacing the original parameter with the override parameter to be stored; receive another request to execute the application; generate, based at least in part on the stored indication of replacing the original parameter with the override parameter, a second set of parameters that includes the override parameter; and cause the set of container images to be executed according to the second set of parameters including the override parameter.

EI 20: The non-transitory computer-readable medium of any preceding EI or any combination of the preceding EIs, wherein the compute instance is one of a virtual machine instance, a bare-metal instance, a physical machine, a container, a microVM, a node, or an offload card.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
a set of clusters hosted on a plurality of physical machines, wherein each cluster in the set of clusters includes a virtual machine configured to execute container images;
a container registry service providing a plurality of image repositories, wherein each image repository of the plurality of image repositories is configured to at least store (i) the container images, and (ii) image metadata corresponding to individual ones of the container images;
a compute optimization service configured to store historical resource utilization data associated with executions of the individual ones of the container images; and
a container service comprising computer hardware, wherein the container service is configured to at least:
  receive, from a user computing device, a request to generate a task definition usable to execute a set of container images, wherein the request at least indicates an identifier associated with each container image of the set of container images;
  for each container image in the set of container images,
    obtain, using the identifier associated with the container image, the image metadata associated with the container image from the container registry service; and
    obtain, using the identifier associated with the container image, the historical resource utilization data associated with the container image from the compute optimization service;
  determine an execution order in which the set of container images is to be executed;
  subsequent to determining the execution order, based at least in part on the execution order, the image metadata, and the historical resource utilization data, generate a first task definition usable to execute the set of container images, wherein the first task definition specifies a family name and a set of parameters according to which the set of container images is to be executed;
  identify a first cluster of the set of clusters that is usable to execute the set of container images;
  identify, based at least in part on the set of parameters specified by the first task definition, a first virtual machine in the first cluster; and
  cause the set of container images to be executed in the execution order on the first virtual machine according to the set of parameters specified by the first task definition.

2. The cloud provider system of claim 1, wherein the set of parameters includes a resource allocation amount, and wherein the container service is further configured to determine the resource allocation amount based at least in part on the historical resource utilization data associated with the set of container images.

3. The cloud provider system of claim 1, wherein the set of container images comprises a first container image and a second container image, and wherein the execution order specifies that the second container image is to be executed while, but not before, the first container image is executing.

4. The cloud provider system of claim 1, wherein the container service is further configured to at least:
receive, from the user computing device, an override parameter to be used to modify the first task definition; and
modify the first task definition based at least in part on the override parameter prior to causing the set of container images to be executed.

5. A computer-implemented method comprising:
receiving a request to execute an application comprised of a set of container images, wherein the request at least indicates a plurality of identifiers, and wherein each identifier of the plurality of identifiers is associated with a corresponding container image of the set of container images;
determining, based at least in part on the plurality of identifiers, a set of image metadata corresponding to the set of container images;
determining, based at least in part on the plurality of identifiers, historical resource utilization data associated with the set of container images;
determining an execution order in which the set of container images is to be executed;
subsequent to determining the execution order, generating, based at least in part on the execution order, the set of image metadata, and the historical resource utilization data, a first set of parameters usable to define an execution environment in which the set of container images is to be executed as part of executing the application, wherein the first set of parameters at least indicates an amount of compute capacity to be allocated to executing the set of container images and includes at least one configuration parameter not specified in the request to execute the application, and wherein the first set of parameters includes a family name;
acquiring, based at least in part on the first set of parameters, a compute instance on which the set of container images are to be executed, wherein the compute instance includes at least the amount of compute capacity indicated by the first set of parameters and is configured according to the at least one configuration parameter included in the first set of parameters; and
executing the set of container images on the compute instance according to the first set of parameters.

6. The computer-implemented method of claim 5, wherein the at least one configuration parameter included in the first set of parameters comprises a networking configuration parameter usable to define one or more networking parameters of the compute instance.

7. The computer-implemented method of claim 5, wherein the at least one configuration parameter included in the first set of parameters comprises a disk mount point usable to attach a disk to the compute instance.

8. The computer-implemented method of claim 5, further comprising determining the execution order based at least in part on the plurality of identifiers indicated by the request, wherein the execution order is specified in the first set of parameters.

9. The computer-implemented method of claim 5, further comprising determining, based at least in part on the plurality of identifiers indicated by the request, a condition for terminating the execution of a container image in the set of container images, wherein the condition is specified in the first set of parameters.

10. The computer-implemented method of claim 5, further comprising:
subsequent to the generation of the first set of parameters, receiving a request to modify the first set of parameters to replace an original parameter in the first set of parameters with an override parameter;

replacing the original parameter in the first set of parameters with the override parameter; and executing the application according to the first set of parameters in which the original parameter has been replaced with the override parameter.

11. The computer-implemented method of claim 10, further comprising:

storing an indication of replacing the original parameter with the override parameter;

receiving another request to execute the application;

based at least in part on the stored indication of replacing the original parameter with the override parameter, generating a second set of parameters that includes the override parameter; and executing the set of container images according to the second set of parameters including the override parameter.

12. The computer-implemented method of claim 5, wherein the compute instance is one of a virtual machine instance, a bare-metal instance, a physical machine, a container, a microVM, a node, or an offload card.

13. A non-transitory computer-readable medium storing instructions that, when executed by a computing system, cause the computing system to at least:

receive a request to execute an application comprised of a set of container images, wherein the request at least indicates a plurality of identifiers, and wherein each identifier of the plurality of identifiers is associated with a corresponding container image of the set of container images;

determine, based at least in part on the plurality of identifiers, a set of image metadata corresponding to the set of container images;

determine, based at least in part on the plurality of identifiers, historical resource utilization data associated with the set of container images;

determine an execution order in which the set of container images is to be executed;

subsequent to determining the execution order, generate, based at least in part on the execution order, the set of image metadata, and the historical resource utilization data, a first set of parameters usable to define an execution environment in which the set of container images is to be executed as part of executing the application, wherein the first set of parameters at least indicates an amount of compute capacity to be allocated to executing the set of container images and includes at least one configuration parameter not specified in the request to execute the application, and wherein the first set of parameters includes a family name;

acquire, based at least in part on the first set of parameters, a compute instance on which the set of container images are to be executed, wherein the compute instance includes at least the amount of compute capacity indicated by the first set of parameters and is configured according to the at least one configuration parameter included in the first set of parameters; and cause the set of container images to be executed on the compute instance according to the first set of parameters.

14. The non-transitory computer-readable medium of claim 13, wherein the at least one configuration parameter included in the first set of parameters comprises a networking configuration parameter usable to define one or more networking parameters of the compute instance.

15. The non-transitory computer-readable medium of claim 13, wherein the at least one configuration parameter included in the first set of parameters comprises a disk mount point usable to attach a disk to the compute instance.

16. The non-transitory computer-readable medium of claim 13, storing further instructions that, when executed by the computing system, cause the computing system to at least determine the execution order based at least in part on the plurality of identifiers indicated by the request, wherein the execution order is specified in the first set of parameters.

17. The non-transitory computer-readable medium of claim 13, storing further instructions that, when executed by the computing system, cause the computing system to at least determine, based at least in part on the plurality of identifiers indicated by the request, a condition for terminating the execution of a container image in the set of container images, wherein the condition is specified in the first set of parameters.

18. The non-transitory computer-readable medium of claim 13, storing further instructions that, when executed by the computing system, cause the computing system to at least:

receive, subsequent to the generation of the first set of parameters, a request to modify the first set of parameters to replace an original parameter in the first set of parameters with an override parameter;

cause the original parameter in the first set of parameters to be replaced with the override parameter; and cause the application to be executed according to the first set of parameters in which the original parameter has been replaced with the override parameter.

19. The non-transitory computer-readable medium of claim 18, storing further instructions that, when executed by the computing system, cause the computing system to at least:

cause an indication of replacing the original parameter with the override parameter to be stored;

receive another request to execute the application;

generate, based at least in part on the stored indication of replacing the original parameter with the override parameter, a second set of parameters that includes the override parameter; and cause the set of container images to be executed according to the second set of parameters including the override parameter.

20. The non-transitory computer-readable medium of claim 13, wherein the compute instance is one of a virtual machine instance, a bare-metal instance, a physical machine, a container, a microVM, a node, or an offload card.

* * * * *